March 1, 1966     E. E. LOVELL     3,237,866
RETRACTABLE NOZZLE
Filed Feb. 27, 1964     2 Sheets-Sheet 1
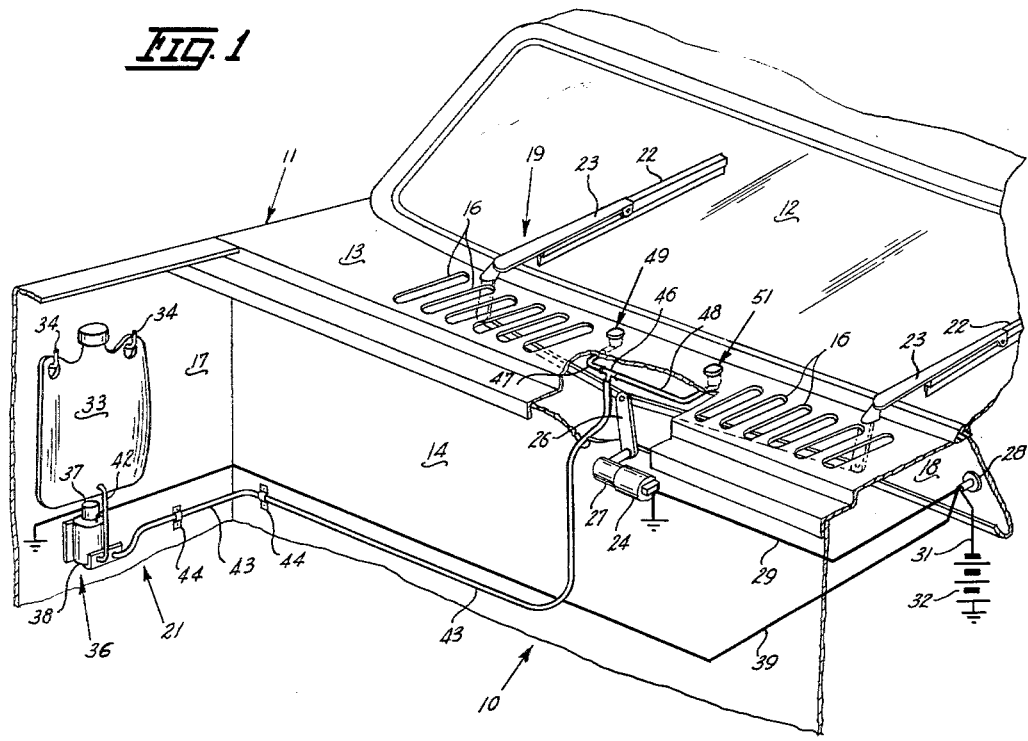
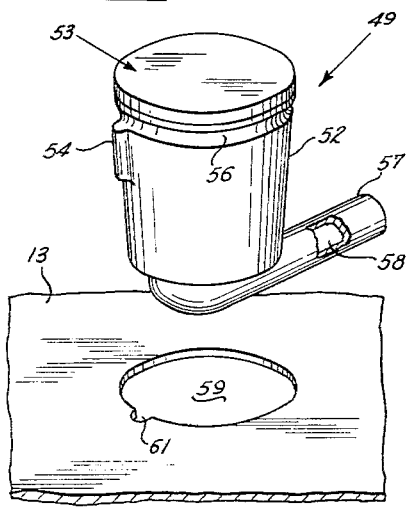
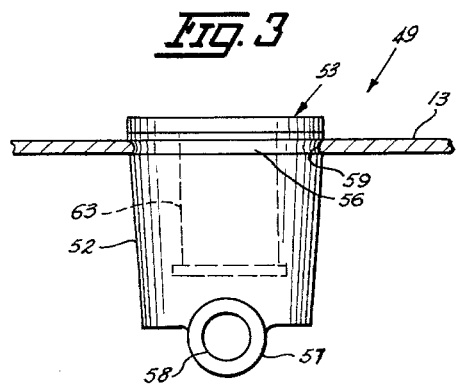
INVENTOR.
ERNEST E. LOVELL
BY *Rudolph L. Lovell*
ATTORNEY.

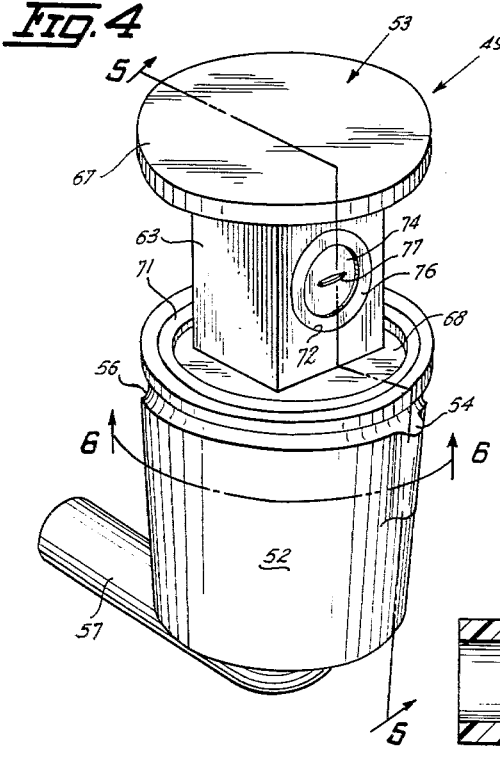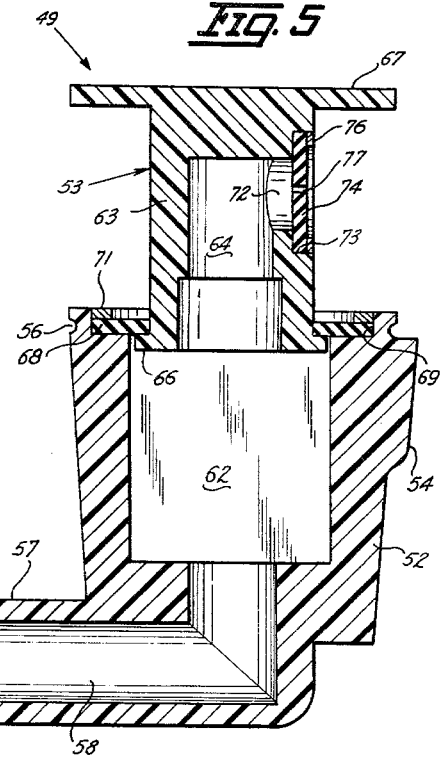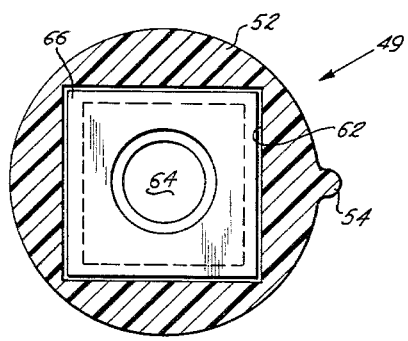

United States Patent Office 3,237,866
Patented Mar. 1, 1966

3,237,866
RETRACTABLE NOZZLE
Ernest E. Lovell, Detroit, Mich., assignor to Delman Company, Cookeville, Tenn., a corporation of Tennessee
Filed Feb. 27, 1964, Ser. No. 347,880
5 Claims. (Cl. 239—204)

This invention relates to windshield washing systems and more particularly to a nozzle assembly for directing washing fluid onto the windshield of a vehicle.

The object of this invention is to provide an improved fluid discharging nozzle assembly.

Another object of the invention is to provide a nozzle assembly having a fluid discharging portion which is enclosed and concealed when liquid is not being discharged therethrough and which moves to an open discharging position under the influence of hydrostatic pressure in the nozzle assembly.

A further object of the invention is to provide a fluid discharging nozzle assembly having a resilient discharge disc section formed with a fluid discharging orifice operative to automatically eject solid materials to purge the nozzle assembly of clogging solid material.

An additional object of the invention is to provide a rugged and durable nozzle assembly which is reliable and efficient in use, relatively simple and economical in construction and cost of installation.

Further objects and features and advantages of this invention will appear from the following description when taken in connection with the accompanying drawing, in which:

FIG. 1 is a fragmentary perspective view of a vehicle equipped with a windshield washer system having a pair of nozzle assemblies of this invention;

FIG. 2 is an enlarged partially exploded perspective view of one of the nozzle assemblies and a portion of the cowl of the vehicle;

FIG. 3 is an elevational view partly in section of a nozzle assembly mounted on the cowl of a vehicle;

FIG. 4 is an enlarged perspective view of one of the nozzle assemblies of FIG. 1;

FIG. 5 is a sectional view taken along the line 5—5 of FIG. 4; and

FIG. 6 is a sectional view taken along the line 6—6 of FIG. 4.

Referring to the drawing, there is shown in FIG. 1 a windshield clearing system, indicated generally at 10, in assembled relation with a motor vehicle 11 equipped with an upwardly and rearwardly extended windshield 12. Positioned adjacent the lower edge of the windshield 12 is a forwardly extended cowl 13 which is secured to a downwardly extended fire wall 14. Extended transversely across the cowl 13 are a plurality of ventilating and heater openings 16. The opposite end sections of the cowl 13 and fire wall 14 are attached to the vehicle body side walls 17, one of which is shown. A dashboard 18 is positioned rearwardly of and below the windshield 12.

The windshield clearing system 10 comprises a wiper unit and a washer unit indicated generally at 19 and 21, respectively. The wiper unit 19 includes a pair of wiper elements 22 positioned in engagement with the outside surface of the windshield 12. Arms 23 support the wiper elements 22 adjacent the forward edge of the windshield 12. The wiper elements 22 and their respective arms 23 are oscillated with respect to the windshield 12 by a motor 24 connected to the arms 23 by a linkage 26.

The motor 24 is illustrated as an electrically operated unit having a power transmission mechanism 27. The linkage 26 is operatively coupled to the transmission mechanism 27. A manually operated switch 28 mounted on the dashboard 18 is connected by line 29 to the motor 24. Line 31 connects the switch 28 to the battery 32 of the vehicle. The switch 28 is an on-off unit operable to connect and disconnect the motor 24 and battery 32. When the motor 24 is energized the linkage 26 is moved by the power transmission mechanism 27 to transmit motion to the arms 23 which in turn oscillates the wiper elements 22 over windshield 12.

The washer unit 21 has a reservoir 33 for storing a supply of washer solvent. Brackets 34 secured to the side wall 17 support the reservoir 33 in an upright position. Mounted on the side wall 17 below the reservoir 33 is a combination motor and pump assembly 36 comprising an electric motor 37 drivably connected to a gear pump 38. A line 39 connects the electric motor 37 to the switch 28. Included in the switch 28 are electrical contacts (not shown) which are operable to connect and disconnect the battery and the electric motor 37. This is a manual operation which is independent of the actuation of the switch for the wiper motor 24.

A hose 42 couples the bottom of the reservoir 33 with the intake side of the pump 38 and functions to provide a direct fluid communication from the reservoir 33 to the pump. With the pump 38 positioned below the reservoir 33 it is always primed with cleaning fluid.

The outlet of the pump 38 is connected to a hose 43 secured to the side wall 17 and fire wall 14 by brackets 44. The hose 43 extends through a hole in the fire wall and is positioned under the cowl 13. A T-coupling 46 connects the outlet end of the hose 43 with two hoses 47 and 48.

A pair of fluid dispensing nozzle assemblies 49 and 51 are attached to the cowl 13 forwardly of the windshield 12. The nozzle assemblies function to dispense cleaning fluid onto the windshield into the path of movement of the oscillating wiper elements 22. The hoses 47 and 48 are coupled to the nozzle assemblies 49 and 51, respectively, to provide a fluid communication between the pump 38 and the nozzle assemblies 49 and 51.

When the switch 28 is operated to connect the battery 32 with the electric motor 37, the pump 38 is operated to draw cleaning fluid from the reservoir 33 and to discharge the cleaning fluid under pressure into the hose 43. The T-coupling 46 connected to the outlet end of the hose 43 directs the fluid to the hoses 47 and 48 which in turn direct the fluid into the nozzle assemblies 49 and 51. The cleaning fluid under pressure is discharged by the nozzle assemblies 49 and 51 in continuous streams of fluid which are deposited on the windshield 12. These streams will be continuous as long as the motor 37 is electrically coupled to the battery 32. Manual operation of the switch 28 to the "off" position for the washer unit 21 terminates the washing action.

Since the fluid dispensing nozzle assemblies 49 and 51 are identical in construction and operation, the following detailed description is limited to the nozzle assembly 49 which is illustrated in FIGS. 2 to 6.

Referring to FIG. 2, nozzle assembly 49 comprises a cylindrical-shaped housing 52 and a nozzle member 53. The housing 52 is formed from plastic material and has a tapered peripheral wall and an integral upright rib 54. The upper section of the side wall of the housing 52 has an annular groove 56. Integral with the bottom wall of the housing 52 is a laterally projected nipple 57 having a central passage 58. The hose 47 is positioned about the nipple 57.

As shown in FIGS. 2 and 3, the cowl 13 is provided with a hole 59 the side wall of which is formed with a radial slot 61. The nozzle assembly 49 is mounted on the cowl 13 by inserting the housing 52 through the hole 59 with the rib 54 in alignment with the slot 61. In the assembled position the side wall of the hole 59 is seated in a tight fit relation in the annular groove 56 of the housing 52. The rib 54 is positioned in the slot 61 thereby preventing rotation of the housing 52 with respect to the cowl 13.

Referring to FIGS. 5 and 6, it is seen that the housing 52 has a longitudinal square bore 62 which is open to the passage 58. The nozzle member 53 is positioned in a concentric relation with the bore 62 and comprises a body 63 of a square shape in transverse section and formed from plastic material with a central upright bore 64 open to the bore 62. The lower edge of the body 63 has a square lateral flange 66 having dimensions slightly smaller than the square bore 62 so that the nozzle member 53 is free to move within the bore 62. The top edge of the body 63 has a circular-shaped peripheral flange 67 extended in a lateral direction and of a diameter substantially equal to the diameter of the top of the housing 52. As shown in FIGS. 2 and 3, the flange 67 rests on the top of the housing 52 when the nozzle member 53 is in a retracted position.

A rubber seal 68 having a square central opening is positioned about the square body 63 engaging the flat surfaces thereof. The peripheral section of the seal 68 is seated in an annular recess 69 formed in the top of the housing 62. A washer 71 is positioned in the recess 69 above the seal 68 and functions to clamp the seal to the housing 52. The seal 68 cooperates with the flange 66 of the body to prevent the flow of cleaning fluid between the housing 52 and the nozzle member 53.

As shown in FIG. 5, one of the flat side walls of the body 63 has an opening or passage 72 with a counterbore 73 at its outer end. A flexible disc 74 of resilient material, such as rubber or plastic, is seated in the counterbore 73 and closes the opening 72. A washer 76 is positioned in a tight fit relation with the walls of the counterbore 73 and clamps the peripheral section of the disc 74 to the body 63. The center area of the disc 74 has an elliptical-shaped opening 77.

On operation of the pump 38 by the electric motor 37 cleaning fluid is transmitted through hoses 43 and 47 into the passage 58 and bore 62 of the nozzle assembly 49. As the pressure of the cleaning fluid in the bore 62 increases the nozzle member 53 is moved from a retracted position as shown in FIG. 3 to an extended position shown in FIG. 4. The flange 66 (FIG. 5) of the nozzle member 53 is held in a bearing engagement with the rubber seal 68 and prevents the flow of cleaning fluid between the housing 52 and the nozzle member 53.

Cleaning fluid under pressure in bores 62 and 64 is discharged through the elliptical-shaped opening 77 in the flexible disc 74 as a stream of liquid which is deposited onto the windshield 12 in the path of movement of a wiper element 22.

The stream of liquid discharged through the opening 77 is maintained in alignment to hit the windshield 12 by the location of the slot 61 in the cowl relative to the rib 54 on the housing 52. The rib 54 when positioned in the slot prevents rotation of the housing 52 with respect to the cowl 13.

Since the nozzle assembly 51 is connected to the same supply of fluid pressure as the nozzle assembly 49, the nozzle assemblies 49 and 51 operate simultaneously to dispense streams of cleaning fluid onto the windshield 12. These streams of cleaning fluid are constant and continuous so long as the pump 38 discharges cleaning fluid into the hose 44.

In the event that the opening 77 in the flexible disc 74 becomes clogged with solid foreign material the fluid pressure in the chamber formed by the bores 62 and 74 is increased. This increase in pressure will deform the flexible disc 74 and expand the size of the opening 77, whereby the foreign solid material is forced therethrough by the increased fluid pressure with the result that the nozzle assembly purges itself of clogging foreign material.

The pressure of the cleaning fluid in the nozzle assembly 49 returns to its normal operating pressure after the foreign material has passed through the opening 77.

When the electric motor 37 has been disconnected from the battery 32 the pump 38 discontinues its discharge of cleaning fluid in the hose 43. The pressure of the cleaning fluid in the hose 43 in the nozzle assemblies 49 and 51 acts on the pump 38 operating it in a reverse direction so that it discharges a small amount of cleaning fluid back into the reservoir 33. This reverse operation of the pump 38 lowers the level of the cleaning fluid in the nozzle assemblies 49 and 51 so as to permit the return of the nozzle members under the influence of gravity into the nozzle housings. The lowering of the level of the cleaning liquid in the nozzle assemblies establishes a slight subatmospheric pressure which complements the retraction of the nozzle members into the housings.

In summary the nozzle assembly of this windshield washer system has a housing which is readily and quickly attachable to the cowl of a vehicle and a nozzle member 53 having a flexible disc containing a fluid discharging orifice 77 mounted in the side wall thereof. The nozzle member moves into and out of the housing 52 to conceal the fluid discharging opening 77 when the liquid solvent or cleaning fluid is not being dispensed onto the windshield. The application of hydrostatic pressure to the nozzle assembly moves the nozzle member 53 to an exposed position wherein the fluid discharging opening 77 is in alignment with the windshield 12 with the result that the cleaning fluid being discharged through the opening 77 is deposited on the windshield in the path of movement of the wiper elements 22. The nozzle member 53 returns to its concealed position under the influence of gravity when the fluid pressure supplied to the nozzle assembly is terminated.

While there have been shown, described, and pointed out the fundamental novel features of the invention, it is to be understood that various omissions, substitutions, changes in form and details of the nozzle assembly illustrated my be made by those skilled in the art, without departing from the scope of the invention which is to be limited only as indicated by the appended claims.

I claim:

1. In a vehicle equipped with a windshield and a windshield washer system,
   (a) a cowl extended forwardly of the windshield, said cowl having at least one hole with a side wall and a slot in said side wall,
   (b) a nozzle assembly for said windshield washer system operable to receive cleaning fluid under pressure and to discharge the cleaning fluid onto the windshield, said nozzle assembly including
   (c) housing means having a longitudinal bore for receiving the fluid under pressure, an outer peripheral wall of a shape which corresponds to the shape of the hole in the cowl, an upright rib, and at least one annular groove in said peripheral wall, said housing means being positioned in said hole with the rib placed in the slot and a portion of said side wall projected into said groove whereby said housing means is held against transverse and rotational movement relative to said cowl, and
   (d) a nozzle member slidably mounted on said housing means for movement from a concealed position to an exposed position, said nozzle member including a fluid discharging orifice facing the windshield whereby when fluid under pressure is supplied to the housing said orifice is moved from the concealed position to the exposed position and fluid is discharged through the orifice onto the windshield.

2. In a vehicle equipped with a windshield and a windshield washer system,
   (a) a cowl extended forwardly of the windshield, said cowl having at least one hole with a side wall and a slot in said side wall, (b) a nozzle assembly for a windshield washer system operable to receive cleaning fluid under pressure and to discharge the cleaning fluid onto the windshield, said nozzle assembly including (c) housing means having a longitudinal bore for receiving the cleaning fluid under pressure, an outer peripheral wall of a shape which corresponds to the shape of the hole in the cowl, an upright rib, and at least one annular groove in said peripheral wall, said housing means being positioned in said hole with the rib placed in the slot and a portion of said side wall projected into said groove whereby said housing means is held against vertical and rotational movement relative to said cowl, (d) a body member slidably positioned in the bore of the housing for movement between a concealed position and an exposed position, said body member having a bore open to the bore in the housing and a passage means open to said bore in the body member, (e) seal means mounted on said housing and engageable with said body member to maintain a fluid sealed relationship between the body member and housing, and (f) flexible diaphragm means having a fluid discharging orifice mounted on said body member and extended over the passage means therein whereby when cleaning fluid under pressure is supplied to the housing the body member moves from the concealed position to the exposed position and the fluid is discharged through the orifice in the flexible diaphragm.

3. The nozzle assembly defined in claim 2 including:

(a) coacting means of said housing and said body member to prevent rotational movement of said body member relative to said housing whereby said discharging orifice is maintained within an upright plane on movement from the concealed position to the exposed position to provide a predetermined path of fluid discharge relative to said housing and said cowl on repeated movement of said body member.

4. A nozzle assembly for a windshield washer system operable to receive cleaning fluid under pressure and to direct the cleaning fluid onto the windshield of a vehicle comprising:

(a) a housing having a bore adapted to receive fluid under pressure, (b) a body member having a side wall slidably positioned in the bore of the housing, said body member telescoped into the bore of said housing for movement between a concealed position and an exposed position, said body member having an upright bore open to the bore in the housing and a passage means in the side wall open to said upright bore in the body member, and (c) diaphragm means having a fluid discharge orifice mounted on said side wall and extended over the passage means whereby when cleaning fluid under pressure is supplied to the housing the discharge orifice moves from the concealed position to the exposed position and the fluid is discharged through the orifice in the flexible diaphragm means.

5. The nozzle assembly defined in claim 4 including:

(a) coacting means on said housing and said body member to maintain said side wall in a common plane during repeated movements from the concealed position to the exposed position, and (b) seal means mounted on said housing and engageable with said body member to maintain a fluid sealed relationship between said body member and said housing, said seal means operable on movement of said body member to the exposed position under fluid pressure to effect an increased sealing pressure between said body member and said housing.

References Cited by the Examiner

UNITED STATES PATENTS

| | | | |
|---|---|---|---|
| 1,636,314 | 7/1927 | Murray | 239—535 |
| 2,308,476 | 1/1943 | Gerrer | 239—535 |
| 3,117,727 | 1/1964 | Pollock et al. | 239—284 X |
| 3,127,116 | 3/1964 | Pollock et al. | 239—284 X |

LOUIS J. DEMBO, *Primary Examiner.*

HADD S. LANE, *Examiner.*